United States Patent [19]

Yoshida et al.

[11] Patent Number: 4,625,085
[45] Date of Patent: Nov. 25, 1986

[54] MATERIAL FOR HIGH FREQUENCY SUPPRESSION AND DISTRIBUTOR FOR COMBUSTION ENGINE COMPOSED OF THE SAME MATERIAL

[75] Inventors: Ichiro Yoshida, Kariya; Morihiro Atsumi; Shunzo Yamaguchi, both of Okazaki; Naotaka Nakamura, Chita; Kenji Yagi, Nagoya, all of Japan

[73] Assignees: Nippondenso Co., Ltd, Kariya; Toyota Jidosha Kabushiki Kaisha, Toyota, both of Japan

[21] Appl. No.: 639,204

[22] Filed: Aug. 9, 1984

[30] Foreign Application Priority Data

Aug. 19, 1983 [JP] Japan ................. 58-151805

[51] Int. Cl.$^4$ .............................................. H01H 19/00
[52] U.S. Cl. .............................. 200/19 R; 200/19 DR; 200/19 DC
[58] Field of Search .......... 200/19 R, 19 DC, 19 DR, 200/264–267

[56] References Cited

U.S. PATENT DOCUMENTS 4,345,120  8/1982  Sawada et al. ............ 200/19 DR X

Primary Examiner—J. R. Scott
Attorney, Agent, or Firm—Cushman, Darby & Cushman

[57] ABSTRACT

A distributor having electrodes made of a sintered body composed of a composite material such that the distributor can suppress radio noises to thereby prevent electric interference. The material for the electrodes, the sintered body, is composed of 45–90 mol % of zinc oxide and 55–10 mol % of ferrite, which can suppress radio noises generated between the electrodes due to spark discharging. At the same time, the energy loss within such composite material is small and consumption of electrode can be restrained. Electrode durability is further improved by including bismuth oxide, manganese oxide and cobalt oxide in the electrode material. An ignition plug and electric discharge machine can also advantageously use the electrodes composed of such materials.

4 Claims, 10 Drawing Figures

MATERIAL FOR HIGH FREQUENCY SUPPRESSION AND DISTRIBUTOR FOR COMBUSTION ENGINE COMPOSED OF THE SAME MATERIAL

FIELD OF THE INVENTION

The present invention relates to a material for electrodes or contacts wherein spark discharges are generated therebetween. The electrodes or contacts may be used in automotive distributors, in automotive ignition plugs and in electric discharge apparatus. The present invention also relates to materials for high frequency suppression.

BACKGROUND OF THE INVENTION

A general description of the prior art follows.

Electromagnetic interferences from radio noise is generated by a spark discharge between electrodes. It is necessary that materials used for electrodes have low energy loss characteristics while also providing suppression effect for high frequency noise.

The ignition systems of internal combustion engines frequently generate radio noise. Radio noise often adversely affects communications systems such as televisions or radios. The interference problem is compounded as the radio noise is migratory; internal combustion engines having noise generating ignition systems are commonly found in vehicles such as automobiles and as the automobile moves the radio noise generated by the ignition system moves.

Following are the primary causes of the radiation of the radio noise in the ignition system:

(1) spark discharge between electrodes of ignition plugs, (2) spark discharge between a rotating electrode and the fixed electrodes of a distributor, and (3) spark discharge at a break-contact of the distributor, accompanied with the make and break motion.

There have been efforts to suppress the radio noise generated by the spark discharge between a rotating electrode and the fixed electrodes of a distributor. Such efforts are hereinafter explained with respect to method (I) through method (V). However, none of these prior methods has achieved a satisfactory and effective suppression of the radio noise generated by the spark discharged between a rotating electrode and the fixed electrodes of a distributor.

METHOD (I): employing a rotating electrode including resistor

In METHOD (I) a resistor is embedded in a rotating electrode. However, in such an assembly stray capacity exists in the electrode in parallel with the resistor. As a consequence, this method has disadvantages. For instance, only a small noise suppression effect at high frequency ranges above 300 MHz is obtained while a large loss in ignition energy through the resistor (about several kilo ohms) occurs. Moreover, the noise suppression effect is small, e.g. only 5–6 dB even at a low frequency range below 200 MHz.

METHOD (II): employing a flame spray coating electrode

In this method, a high resistive film is formed on the surface of the electrode by flame spray coating method. This method has following two disadvantages:

(1) a large loss in ignition energy, due to the high resistive film formed on the surface, (2) a poor noise suppression effect, for example only 5–5 dB in the frequency range below 200 MHz.

METHOD (III): widening the discharging gap

In this method, each discharging gap between a rotating electrode and fixed electrodes is widened to 1.5–6.4 mm. Advantageously, this provides superior noise suppression effect, for example 15–20 dB.

However, widening the discharge gap between a rotating electrode and fixed electrodes suffers from disadvantages. The disadvantages include an extremely large loss in ignition energy due to a wide discharging gap, and electrode corrosion caused by the corrosive gas affecting metals, such as $NO_x$, which is generated by the higher discharging voltage between electrodes.

METHOD (IV): employing boride, silicide, carbide and conductive ceramics (with the resistivity of $10^{-6}$–$10^{-2}$ ohm cm) for material of electrodes.

The resistivity of such electrodes is relatively small so that the energy loss can be small. However, this method has disadvantages such as a poor noise suppression effect, for example only 5–10 dB at the frequency range below 300 MHz, and easy consumption of electrodes because the low thermal conductivity of the materials causes the local heating of the electrodes.

METHOD (V): employing conductive ferrite for electrodes

This method provides a good noise suppression effect, for example 10–15 dB. However, the electrode is heated by the large current flowing in inductive discharge between the discharging gap. Also the method has such a disadvantage as the local consumption of the electrode because of the discharge heating. Conversely, employing such ferrite that has a high resistivity, both the noise suppression effect and the durability of the electrodes are sufficient, but the energy loss is seriously large.

SUMMARY OF THE INVENTION

Therefore, the primary object of the present invention is to provide a material having a high frequency suppression effect, particularly to suppress a generation of a radio noise.

Another object of the present invention is to provide a material composing electrodes to form a discharging gap therebetween, which is endurable against the discharge, suppressive for a radio noise generated in the discharge and has a small energy loss.

A further object of the present invention is to provide a material suitable for use as an electrode in a distributor, an ignition plug and an electric discharge machine.

Still another object of the present invention is to solve the aforesaid problems of the prior arts and to provide a distributor for an ignition system having a sufficient noise suppression effect.

A further object of the present invention is to provide a distributor for an ignition system, with a small energy loss.

Another object of the present invention is to provide a distributor for an ignition system employing electrodes at low cost, and the end part of which is durable against consumption.

The material for high frequency suppression of the present invention is composed of sintered powdery mixture of zinc oxide in 45–90 mol % and ferrite in 55–10 mol %.

DETAILED DESCRIPTION OF THE INVENTION

Figure 1:
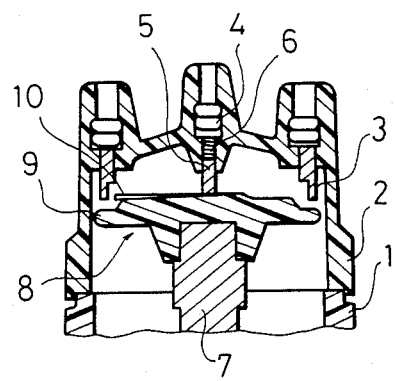
FIG. 1 is a cross sectional view showing the practical structure of the distributor according to the embodiment of the present invention.

FIG. 1 is a cross sectional view showing the structure of the distributor according to the embodiment of the present invention. The distributor comprises a housing 1 and the distributor cap 2 made of insulating material and attached to the housing 1. At the upper bottom of the distributor cap 2, are settled fixed electrodes 3 which project from the cap. The fixed electrodes 3 are respectively connected to each ignition plug through a high-tension wire which is not shown. At the center of the upper bottom of the distributor cap 2, a central terminal 4 is placed projecting. The central terminal 4 is connected to a secondary winding of an ignition coil which are not shown. At the end of the central terminal 4, a conductive spring 6 is disposed which is provided with a slider 5 composed of a carbon and movably supported by the distributor cap 2. The housing 1 and the distributor cap 2 form an inside hollow space, wherein a cam shaft 7 is situated. The cam shaft 7 is rotated interlocking with a crank shaft of the internal combustion engine. At the upper end of the cam shaft 7, a distributor rotor 8 is placed. The distributor rotor 8 comprises an insulating substrate 9 and a rotating electrode 10 disposed on the upper surface of the insulating substrate 9. One side of the rotating electrode 10 is connected with the slider 5 pressurized by the conductive spring 6. The rotating electrode 10 is rotated in accordance with the rotating of the distributor rotor 8, in the manner where the rotating electrode 10 sequentially opposes to each of the plural fixed electrodes 3 so as to form a narrow gap with the fixed electrode. When the rotating electrode 10 comes to oppose to one of the fixed electrodes through a narrow gap therebetween, which is the state as shown in FIG. 1, a high voltage generated by the ignition coil is applied to the central terminal. A spark discharge occurs at the narrow gap as a result of the air ionization. Simultaneously, a discharge occurs at the spark gap within the spark plug, which is connected with the aforesaid narrow gap in series. Thus the desired ignition operation can be performed. In this operation, the spark discharge at the narrow gap in the distributor causes radio noises, as well as the spark discharge within the ignition plug. In the above-mentioned operation, the high voltage is not applied to the discharging gap as a step function, but increases along with a exponential curve characterized by a time constant which is determined by the circuit constant such as the ignition coil and the high-tension wire. When the voltage reaches to the value sufficient to cause a spark discharge, a breakdown occurs at the discharging gap accompanied with a spark discharge. Because of the abrupt breakdown, the discharge current flows suddenly, as narrow pulses (10-100 ampere). This unstable current with high peak value of 10-100 amperes, containing many unfavorable high-frequency waves, causes the high-tension wire to radiate the radio noise. Noise-field intensity is in proportion to the amount of a noise current, therefore, the noise current has to be reduced in order to suppress the radio noises.

The discharging current flowing between the rotating electrode and the fixed electrode is composed of two kinds of currents which are a capacitive discharge and inductive discharge.

In the capacitive discharge, the electric charge accumulated in capacitors abruptly discharges. These capacitors are constructed by the electrodes at discharging gap, the high-tension wire and earth, or the electrodes and earth. Therefore, high-frequency current momentary and abruptly flows in several nanoseconds. In the capacitive discharge, the discharging current is the source of the aforesaid noise current.

On the other hand, the inductive discharge means a low-frequency current (10-100 mA) which flows continuously after the capacitive discharge. The energy for ignition supplied to the ignition plugs is approximately in proportion to the product of the inductive discharge I and the duration of the discharge T, $(I \times T)$.

Figure 2:
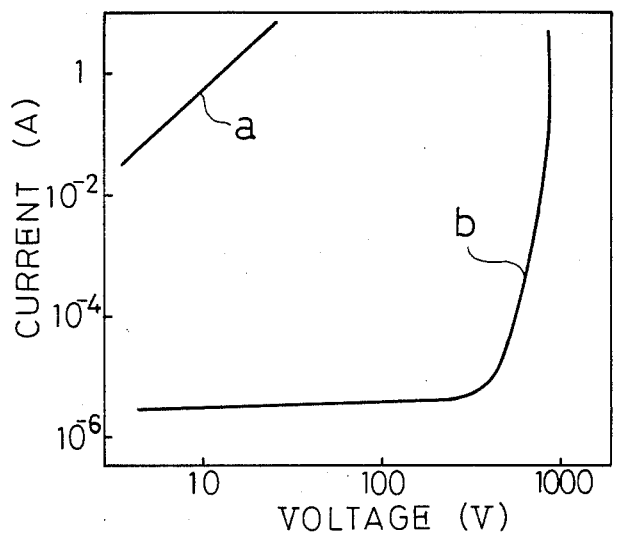
FIG. 2 is a graph showing the characteristic relating to current and voltage of the conductive ceramic used for the conventional electrode and the material used for the electrode according to the present invention.

Accordingly, it is obvious that only the capacitive discharge may be reduced in order to suppress the noise current without reducing the energy for ignition. For this noise suppression purpose, various methods have been proposed, such as the above-described methods (IV and V), which employ conductive ceramic; but the resistivity value for such a ceramic should be small in order to minimize the energy loss. As shown by the line "a" in FIG. 2, excessive current may flow through the electrodes to heat even at the low voltage. Also such ceramics have a low thermal conductivity so that the electrodes are worn out because of the local heating.

According to the present invention, zinc oxide alone or mixed with bismuth oxide and manganese dioxide is employed as one component for the material of electrodes. In this regard, zinc oxide has certain advantageous characteristics. More particularly, zinc oxide may act as a varistor such that the resistivity at a high voltage decreases while ignition energy losses are minimized.

Figure 3:
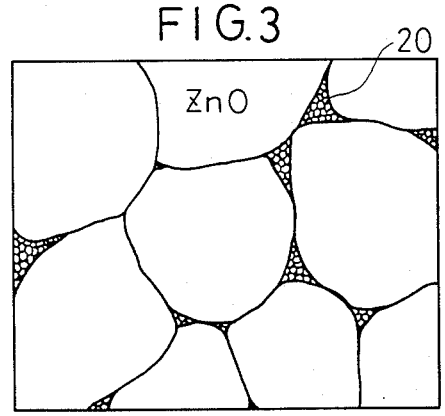
FIG. 3 is a structural view showing the microscopic structure of zinc oxide used in the embodiment of the present invention.

Zinc oxide is a semi-conductive ceramic and the structure thereof is as shown in FIG. 3, which has grain boundary 20. When the noise current flows there-through, the lattice misfit of the grain boundary causes a large resistivity only to the high-frequency noise current so that the noise current can be suppressed.

By adding magnetic materials such as Ni-Zn ferrite to zinc oxide, a high-frequency magnetic flux is induced by the noise current. Thereby the noise current can be suppressed because of the eddy current loss and the hysteresis loss which are caused by the high-frequency magnetic flux. The higher the permeability of the employed magnetic material is, the larger is the eddy current loss and a larger noise suppression effect is obtained at the same frequency. However, the excessive permeability is not preferable because it causes the large loss in low-frequency current. Therefore, there is an adequate range of permeability of the magnetic material. For example, a magnetic material with a relative permeability of 100 can absorb and suppress a noise current in the frequency range of 50–500 MHz, as long as the energy loss is within a permitted range.

The present invention is based on the foregoing features.

In the distributor according to the present invention, a sintered body is employed for either or both of the rotating electrode and the fixed electrode. The body is produced by blending powders of zinc oxide in 45–90 mol % and ferrite in 55–10 mol % and sintering the mixture. The composition of ferrite over 55 mol % causes the large loss in ignition energy above the permitted value, though the noise suppression effect becomes higher. Therefore, the composition of ferrite is preferred to be under 55 mol %, and is preferred to be above 10 mol % because the noise-suppression effect by use of the magnetic characteristics such as an eddy current loss and hysteresis loss is small when it is under 10 mol %.

Various types of ferrite are available and include Ni-Zn ferrite [(Ni-Zn)Fe$_2$O$_4$], Ni ferrite (NiFe$_2$O$_4$), Ni-Mn ferrite (Ni-Mn)(Fe$_2$O$_4$). In general, the other forms of ferrite material can be used wherein (a) the ferrite is characterized by the formula MFe$_2$O$_4$ where "M" designates a metal selected from a group comprising managanese, iron, cobalt, nickel, copper, lithium and the like; (b) the ferrite is characterized by the formula MFe$_{12}$O$_{19}$ where M designates barium, strontium (Sr), lead or the like having a magnetoplumbite type crystalline structure; (c) an iron oxide is characterized as having a perovskite type of crystalline structures such as that the oxide has the formula MFeO$_3$ where "M" designates rare earth elements; and (d) an iron oxide is characterized as having the garnet type of crystalline structure such as one having the formula M$_3$Fe$_5$O$_{12}$ where M designates earth elements.

Figure 9:
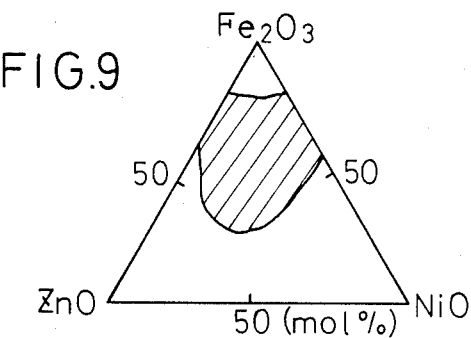
FIG. 9 shows a composition of ferrite employed in the first embodiment.

When employing Ni-Zn ferrite, the preferred composition ratio is designated by the oblique lines in FIG. 9. Zn ferrite effectively improves the permeability.

As the other component of the present invention, zinc oxide may be included along with the ferrite materials or the sintered material (zinc oxide and ferrite) may also include bismuth oxide, manganese oxide, cobalt oxide or mixtures thereof. The addition of these materials can improve the durability of the sintered body.

Zinc oxide is employed as one component for the material of the electrode used for the present invention. Zinc oxide has a characteristic as a varistor, the resistivity of which is high at low-voltage and reduced as the voltage getting higher. Therefore, the loss in ignition energy at the electrodes can be minimized by selecting the range of low resistivity. The high-frequency noise current is generated when the voltage at the gap is high that is electric field in the electrodes is small. The high-frequency current flows within the high resistivity range of zinc oxide so that the current can be suppressed. The addition of ferrite to zinc oxide can cause an eddy current loss or hypteresis loss due to the high frequency magnetic flux which is produced by the capacitive discharging current. Thus, the capacitive discharging current can be restrained to flow. Consequently, the electrodes composed of the material which comprises zinc oxide and ferrite blended in a determined proportion can be effective for minimizing the loss in the ignition energy at the electrodes and also effective for suppressing the radio noise.

DESCRIPTION OF THE PREFERRED EMBODIMENTS

Hereinafter, the preferred embodiments will be described.

EMBODIMENT 1

Figure 4:
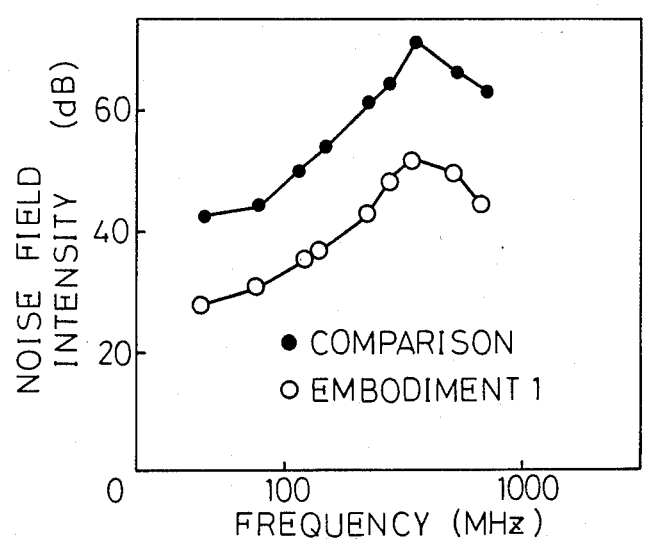
FIG. 4 is a graph showing the measurement of the frequency characteristic of intensity of the noise field radiated from the distributor according to the embodiment of the present invention.

Materials composed of ferric oxide (Fe$_2$O$_4$) in 50 mol %, nickel oxide (NiO) in 35 mol % and zinc oxide (ZnO) in 15 mol % were pulverized and mixed together by set blending in a ball mill, then they were temporarily sintered for two hours at 1100° C. so that Ni-Zn ferrite was compounded. The relative permeability of this ferrite was 1000. The polyvinylalcohol (PVA) in 1 weight % was added as a binder to the compounded ferrite in 40 mol % with zinc oxide 60 mol %, thereafter the whole materials were formed into a shape of a rotating electrode by a dry pressure compacting. This formed body was processed by sintering at the speed of temperature up of 100° C. per hour, keeping at 1400° C. for two hours, and at the speed of temperature down of 100° C. per hour. The resistivity of the rotating electrode obtained by this process was $2 \times 10^5$ ohm cm at 100 V DC, and the relative permeability thereof was about 50. FIG. 4 shows the measuring result of the noise-field intensity when this rotating electrode was mounted on a distributor and operated in the condition that the rotating speed of a crank shaft was 1500 rpm. In FIG. 4, noise-field intensity of 1 $\mu$A/m within 120 KHz band is determined as 0 db. As apparent from this figure, the distributor according to the present invention had more improved noise suppression effect of 20–30 dB, compared with the conventional distributor employing conventional metallic electrodes.

Also a conventional type of a distributor composed of conductive ferrite has a problem in durability though it is effective considering the noise-suppression. Compared with this conventional one, the distributor of the present invention could be more durable. A car equipped with the distributor according to the present invention was operated for 100,000 km; the distributor of the present invention operated without any problems. It is because the electrode used in the present device were made of such material that the resistivity thereof is high in the low voltage range, and low in the high voltage range as described by the curve "b" in FIG. 2, and therefore, the peak value of the discharging current was depressed to the low level so that local heating could be prevented.

Figure 5:
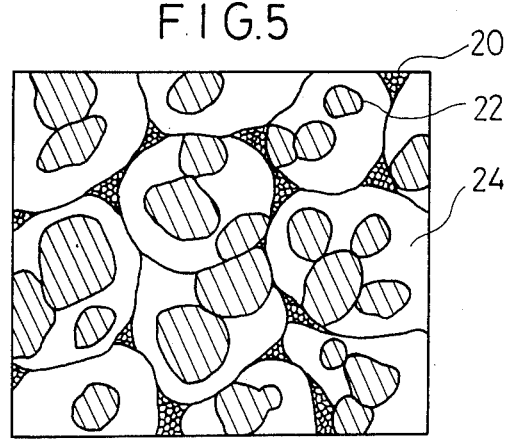
FIG. 5 is a structural view showing the microscopic structure of zinc oxide added with ferrite.

Generally, the material of a high resistivity is likely to cause a large energy loss. The material of the electrodes according to the present invention was organized as shown in FIG. 5, wherein zinc oxide particles 24 around ferrite particles 22 form a grain boundary. The contact resistance between zinc oxide 24 and ferrite 22 and that among each particles of zinc oxide 24 within the grain boundary were abruptly reduced in a high voltage. Thus, the material had a characteristics of a varistor as designated with a curve "b" in FIG. 2 and the energy loss could be restrained to such a level as not to affect the normal running by a car.

Conventionally, as so-called conductive ferrite is composed of ternary system $Fe_2O_3$-ZnO-NiO, the proportion of which is respectively 70 mol %, 10 mol % and 20 mol %. The resistivity of this ferrite is about 10 ohm cm and the relative permeability is about 50.

As other conductive ferrite, is also known a ternary system ferrite, which is composed of $Fe_2O_3$ in 70–80 mol %, MnO in 10–20 mol % and ZnO in 10–20 mol %, respectively.

Figure 6:
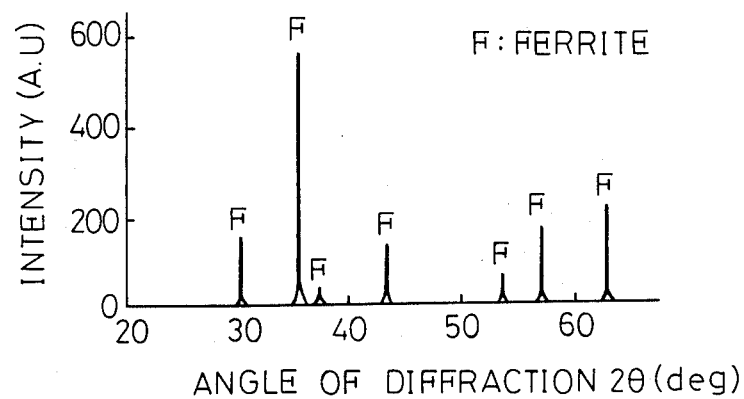
FIG. 6 is a graph showing the measurement result of ferrite organization by X-ray photoelectronic spectroscope.
Figure 7:
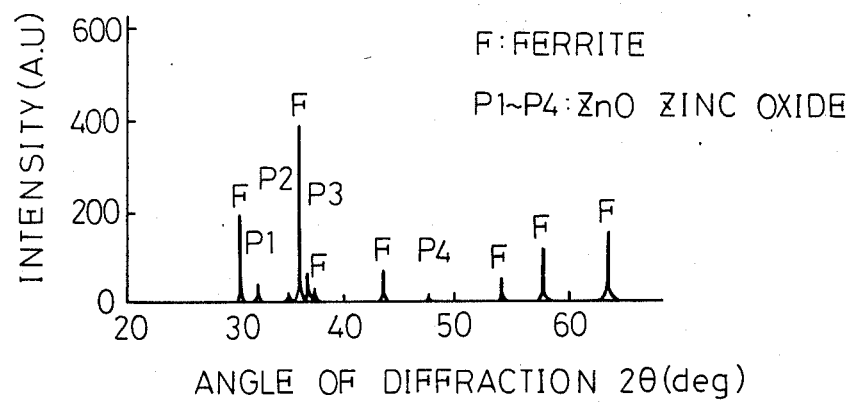
FIG. 7 is a graph similar to FIG. 6, but shows the result of the material composed of zinc oxide blended with ferrite according to the embodiment of the present invention.

The difference of the material composing the the present invention from the conventional conductive ferrite is that zinc oxide particles are blended with the ferrite particles in the present invention. This fact was proved by the experimental data of the ferrite material of a single phase and the material of the present embodiment, which were measured by means of a X-ray photoelectronic spectroscope. FIG. 6 shows the result of the ferrite material of a single phase, and FIG. 7 is of the mixed crystal of the present embodiment composed of zinc oxide and ferrite, both of which were measured by means of a X-ray electronic spectroscope. As apparent from FIG. 7, there are peaks P1, P2, P3 and P4 caused by linkage of Zn-O so that the existence of zinc oxide crystal grains are found in the materials according to the present embodiment.

In the present embodiment, ferrite with high permeability is dispersed in zinc oxide. For suppressing the high-frequency noise current, the material with high permeability is preferred to be disposed in the flowing way of the current. The high permeability material is compounded by solid solution of other additional material in 50 mol % with ferric oxide in 50 mol % from a stoichiometrical point of view. However, it is hard to make the conductive ferrite to have a high permeability, for ferric oxide occupies large ratio as afore-mentioned.

According to the present invention, zinc oxide with additional high permeability material is integrally sintered, resulting in the high suppression effect on radio noises. Also the range of frequency that can be absorbed by the material can be adjusted by selecting an added magnetic material with a proper permeability.

EMBODIMENT 2

Figure 8:
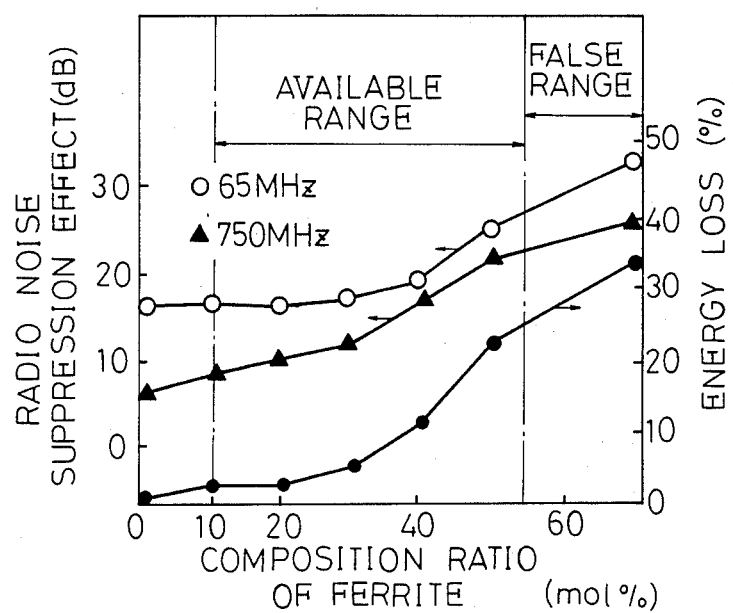
FIG. 8 is a graph showing the measurement of the noise suppression effect and the energy loss using various electrodes with varied composition ratio of ferrite.

Next, various kinds of mixture were prepared by changing respectively the composition ratio of zinc oxide and ferrite. And the noise suppression effect in response to the composition of ferrite were measured so that the result is shown in FIG. 8, in which the energy loss is also shown. The formation of ferrite was similar to that of the first embodiment. This result shows that the addition of ferrite above 55 mol % is an obstacle to ignition facilies because it reduces the discharge energy at the ignition plugs. Therefore, the composition of ferrite has to be depressed under 55 mol %. Reversely, the noise-suppression effect is reduced when the ferrite is under 20 mol %.

EMBODIMENT 3

Figure 10:
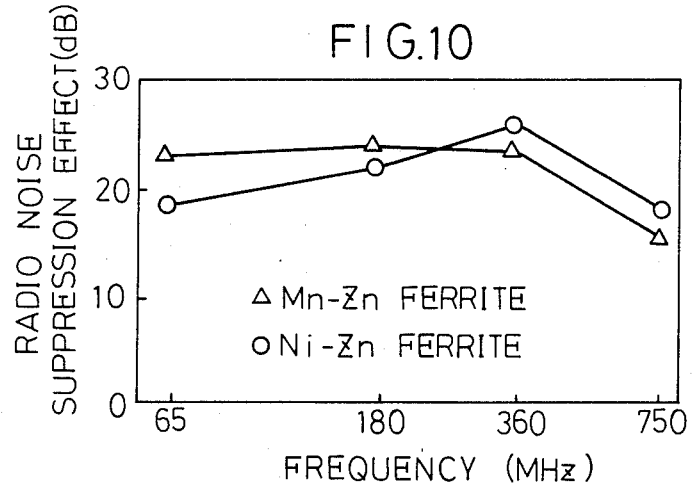
FIG. 10 is a graph showing the measurement of frequency characteristic of noise suppression effect in the comparison of zinc-oxide added with Ni-Zn ferrite and zinc-oxide added with Mn-Zn ferrite.

Another ferrite (Mn-Zn ferrite) was employed as an additional magnetic material to zinc oxide, which was a ternary compound comprising ferric oxide, manganese oxide and zinc oxide. By the similar process with the first embodiment, Mn-Zn ferrite was compounded from the material composed of ferric oxide in 50 mol %, manganese oxide in 20 mol % and zinc oxide in 30 mol %. Relative permeability of abovementioned compounded ferrite is 3000. FIG. 10 shows a frequency characteristics for the radio noise suppression of a distributor, which employs electrodes composed of such compounded ferrite as 70 mol % for powdery ferrite and 30 mol % for zinc oxide. And it is found that the noise suppression effect of the compound according to the present embodiment is rather high at the lower frequency side, compared with a compound comprising Zno and Ni-Zn ferrite in the first embodiment.

According to the present invention, a material for high frequency suppression can be obtained. The present material is not limited to be used for the above mentioned electrodes for a distributor, but also employed for electrodes for an ignition plug and for an electric discharge machine.

Obviously, numerous modifications and variations of the present invention are possible in light of the above teachings. It is therefore to be understood that within the scope of the appended claims, the invention may be practiced otherwise than as specifically described herein.

What is claimed is:

1. A distributor comprising:
    a center electrode;
    a rotating electrode rotating in connection with said center electrode;
    a plurality of fixed electrodes sequentially opposed to said rotating electrode to form a narrow gap therebetween and each electrically connected to each of an associated ignition plug;
    wherein said distributor distributes a high voltage generated by an ignition coil to said ignition plugs via said center electrode, said rotating electrode, and said fixed electrode through a spark discharge occurred at said narrow gap between said rotating electrode and one of said fixed electrodes; and wherein
    at least one of (a) said rotating electrode or (b) said plurality of fixed electrodes is composed of a sintered ceramic consisting essentially of a mixture of 45–90 mol % of zinc oxide (ZnO) and 55–10 mol % of ferrite.

2. A distributor according to claim 1, wherein said ferrite is composed of Ni-Zn ferrite ($(Ni-Zn)Fe_2O_4$) comprising a sintered powdery mixture of nickel oxide (NiO), zinc oxide (ZnO), and ferrous oxide ($Fe_2O_3$).

3. A distributor according to claim 1, wherein said mixture of zinc oxide (ZnO) and ferrite further contains bismuth oxide ($Bi_2O_3$), manganese dioxide ($MnO_2$), and cobalt oxide (CoO).

4. A distributor according to claim 1, wherein said ferrite is composed of Mn-Zn ferrite ($(Mn-Zn)Fe_2O_4$).

* * * * *